United States Patent Office 2,825,793
Patented Mar. 4, 1958

2,825,793
WELDING ROD AND METHOD OF WELDING

Leland M. Kee, Baltimore, Md., assignor, by mesne assignments, to Air Reduction Company, Incorporated, New York, N. Y., a corporation of New York No Drawing. Application March 25, 1955
Serial No. 496,943

4 Claims. (Cl. 219—146)

This invention relates to a method of forming a titanium bearing alloy weld deposit and to welding electrodes for the same.

There are now in general use many titanium bearing alloys which it is highly desirable to weld with weld metal having substantially the same properties as the base metal. Probably the most important titanium bearing alloys are the chromium nickel stainless steels in which titanium is used to stabilize the alloy against inter-granular corrosion. The titanium in the alloy forms titanium carbide with the available carbon and thereby prevents the formation of chromium carbide at the grain boundaries. The formation of chromium carbide increases the susceptibility of the alloy to inter-granular corrosion. In straight chromium steels, titanium prevents grain growth which reduces the physical properties of the alloy at elevated temperatures. In certain other alloys, titanium is employed to impart special properties to the steel such as improved tensile strength.

When welding titanium bearing steels, it is an obvious and well known advantage to deposit weld metal of the same chemical and mechanical properties as the base metal. Heretofore it has been impractical, if not impossible, to transfer titanium from the electrode to the weld puddle in coated (shielded) electrode arc welding because of the extreme activity of titanium at elevated temperatures. It is possible however, to transfer columbium across the welding arc, and in many instances columbium acts in much the same way as titanium. Columbium for example will act to stabilize chromium nickel stainless steels. The present practice therefore is to weld such steels with coated welding electrodes containing columbium. This practice has the disadvantage of requiring the use of the more expensive element columbium instead of titanium, as well as the further disadvantage that considerably more columbium is required than is titanium to accomplish the same result. In addition the use of columbium stabilized weld metal on titanium stabilized base metal promotes corrosion by the electrolytic cell action of the dissimilar metals. In other instances there is no substitute for titanium, and it has been impossible heretofore to deposit weld metal with suitable properties.

Introduction of titanium into welds by adding finely divided titanium alloys to the coating has been tried unsuccessfully many times in the past. To introduce titanium into welds by adding large quantities of titanium in the core wire is impractical because core wire containing high percentages of titanium cannot be hot rolled or cold formed. It has also been proposed in Thomas Patent No. 2,464,836 to add titanium to the weld by adding aluminum and titanium to the coating to take advantage of the fact that aluminum reacts preferentially to titanium, and therefore protects the titanium from oxidation. While the disclosed principle of preferential reaction is believed to be well founded, the other constituents of the coating with which aluminum and titanium react have not heretofore been recognized and taken into account, and therefore have not been properly selected to produce the desired results.

For example, largely as a result of the improper balance of ingredients reducible by aluminum and the aluminum in the coating, the slag produced by the electrode disclosed in the Thomas patent adheres tenaciously to the weld metal and is therefore generally unacceptable. In addition, electrodes of that type do not provide what is regarded as essential control over the carbon or silicon contents of the weld metal. Both of these ingredients are particularly important to the stainless steel composition inasmuch as the titanium content of the weld metal is related to the carbon content, and the silicon must be kept below some maximum. In type 321 stainless steel, titanium must be in an amount equal to at least five times the carbon content, and the silicon may not exceed 1%. In addition low carbon enhances corrosion resistance.

That no electrode has yet been commercially successful in depositing a titanium stabilized weld metal is evident from the current (3rd) edition of the Welding Handbook (page 854) which states "electrodes that match the composition of the columbium stabilized stainless steels must be used for welding titanium stabilized steels since titanium bearing electrodes are virtually unavailable due to the extreme difficulty in transferring sufficient titanium across the arc for stabilization purposes."

It is an object of the present invention therefore to provide a method of depositing titanium in electric arc weld metal.

It is another object to provide an arc welding electrode coating composition for the deposition of titanium bearing weld metal.

It is another object to provide a titanium stabilized stainless steel welding electrode.

These and other objects and advantages of the invention will be pointed out or will become apparent from the following detailed description.

According to the present invention, these objects are achieved by the utilization of a novel electrode coating composition having the quantities of certain of the elements in the coating composition controlled and related to provide the required deposition of titanium without producing unacceptable amounts of other elements in the weld metal. More particularly it has been found that a coating composition comprising an alkaline earth fluoride, aluminum oxide, titanium dioxide, clay, manganese, magnesium and calcium oxide, ferro-chromium, titanium, or titanium and aluminum, and a binder of alkali silicates, can be balanced to ensure transfer of a pre-determined desired amount of titanium to the weld pool. This coating is characterized by the absence of carbonates and organic compounds, and the absence of all reducible compounds except the controlled amounts of silicates. As particularly applied to titanium stabilized stainless steels, these coatings maintain the titanium-carbon ratio with a minimum amount of titanium while maintaining the silicon content of the weld metal within the permissible maximum.

The primary reason titanium is not recovered in the weld metal in coated electrode arc welding is believed to be because the titanium acts to reduce all reducible compounds in the coating composition. This means that if the reducible compounds are stoichiometrically in excess of the available titanium or other more readily oxidized elements all of the titanium will be reacted (oxidized) and none will be recovered in the weld metal in metallic form. This can be avoided therefore by so selecting the coating materials and the quantity of titanium or other more readily oxidized metals as to provide these metals in excess stoichiometrically with respect to the reducible compounds. Under these conditions, all the reducible compounds are reduced leaving metallic titanium available in the weld metal. The reduction of all reducible compounds may however produce other undesirable results. For instance, the reduction of silicates in the coating increases the silicon content. In the case of type 321 stainless steels, silicon appreciably above 1% in the weld metal causes cracking. This must be avoided. The reduction of carbonates or other sources of carbon acts to raise the carbon content in the weld metal. Again in the case of type 321 stainless steel, where the titanium must be present in an amount at least equal to five times the carbon content, the reduction of carbonates to carbon raises the titanium requirements.

In order to successfully transfer a controlled quantity of titanium to the deposited metal, the composition of the coating must be balanced so as to satisfy the reactions which take place during welding. In order to arrive at the correct result the various reactions must be considered in their proper order. It is recognized that these chemical reactions do not take place successively, as they will be considered in this analysis, but rather they occur concurrently according to the well known laws of chemical reactivity. It is also recognized that these reactions do not go to completion. However, for purposes of qualitative analysis of the problem, the significant reactions can be considered as taking place in a series of successive steps.

In general, titanium reduces all available oxidation products in the coating. The remaining unused titanium is therefore available for transfer to the weld metal. Of this available titanium, some portion is lost to reaction with the oxygen and nitrogen in the arc atmosphere. Since aluminum reacts preferentially to titanium it can be substituted for titanium to satisfy part of the reaction requirements. It is to be understood however that titanium can be used without aluminum if desired. In the coating of the present invention, the only compounds capable of reduction by titanium or aluminum are the compounds of silicon and water. All silicon that exists in the coating in elemental form plays no part in the reaction but is transferred to the deposited metal. If there is not enough aluminum in the coating to react with all of the $SiO_2$ in the coating, the available titanium reacts with the remaining $SiO_2$. In addition to having enough titanium present to take to completion any reaction with $SiO_2$, there must be enough titanium to react with the water while still leaving a sufficient quantity of titanium present to allow for a percentage loss by the formation of oxides and nitrides with oxygen and nitrogen in the air, and still transfer the desired amount to the deposit. Representative equations for these reactions are as follows:

$$3SiO_2 + 4Al \rightarrow 2Al_2O_3 + 3Si$$
$$SiO_2 + Ti \rightarrow TiO_2 + Si$$
$$2H_2O + Ti \rightarrow TiO_2 + 2H_2$$

Applying the above theory, a coating can be made which is capable of satisfactorily transferring titanium to the weld metal while maintaining the silicon content of the weld metal below a predetermined maximum, and while retaining the original carbon content of the core wire in the weld metal so that a minimum amount of titanium is required. In addition control is exercised over the amount of aluminum oxide in the slag, which determines to a large extent the arc action and the tenacity with which the slag adheres to the work. One example of such a coating composition is as follows:

|  | Preferred (parts by wt., wet) | Range (percent by wt., dry) |
|---|---|---|
| Calcium Fluoride | 3.0 | 15-35 |
| Aluminum Oxide | .75 | 1-8 |
| Titanium Dioxide | 4.80 | 30-60 |
| Clay | 0.20 | 1-5 |
| Manganese Metal | 0.34 | 1-7 |
| Magnesium & Calcium Oxide | 0.60 | 1-10 |
| Ferro Chromium | 0.39 | 1-10 |
| Titanium-aluminum alloy (Ti 57.3%, Al 42.2%, Si 0.5%) | 0.90 | 1-20 |
| Sodium and/or Potassium Silicate Binder (40% Solids, 60% H₂O) | 3.28 | (¹) |

¹ Sufficient for extrusion. Not more than 5 times Ti-Al alloy.

In this coating composition the only significant materials capable of reduction by the Al or Ti are the silicates in the clay and in the binder. A significant departure of this electrode coating from prior coatings is the absence of $CaCO_3$ or other carbon producing compounds in any appreciable quantities. Trace amounts of potassium carbonate may be found in the silicate binder and can be reduced but never represent a significant source of carbon when reduced. It has also been found to be advantageous at times to add very small amounts of high weight alkali carbonates to the coating as an arc stabilizer. The carbon pick-up in the weld metal from the reduction of this very minor addition of a carbonate is again insignificant. A maximum of 1% by weight of reducible carbon compounds can be tolerated without appreciably increasing the titanium requirements. The reduction of silicates to silicon raises the silicon content of the weld metal above that of the core wire, but in a predetermined and controlled amount.

As an example of the application of the present invention a coating mixture was prepared in accordance with the above detailed formulation, by first thoroughly mixing the calcium fluoride and aluminum oxide, then adding the other dry ingredients and mixing for 10 minutes. The liquid binder was then added, and the whole mixed for another 10 minutes. This coating was applied to a type 321 stainless steel core wire 5/32" in diameter by the usual extrusion method. The analysis of the core wire is as follows:

|  | Percent |
|---|---|
| C | 0.051 |
| Mn | 1.24 |
| P | 0.024 |
| Si | 0.54 |
| Cr | 17.54 |
| Ni | 10.44 |
| Ti | 0.38 |
| Fe | Balance |

The coating was applied by extrusion through a 0.230 inch diameter die to form an electrode consisting of 24.4% by weight of coating and 75.6% by weight of core wire. The extrusion properties of the coating were good, the coating exhibiting sufficient green strength to withstand normal handling in high speed production. The welding arc characteristics were good, with good arc stability, bead shape and wetting. The slag was very easily removed with a minimum of chipping and brushing required. Welding is preferably performed with reverse polarity (electrode positive). Analysis of an all weld metal sample revealed the following proportion of constituents:

|  | Percent |
|---|---|
| C | 0.048 |
| Mn | 1.58 |
| P | 0.028 |
| Si | 1.00 |
| Cr | 17.52 |
| Ni | 10.58 |
| Ti | 0.36 |
| Fe and impurities | Balance |

It can be seen that this weld metal meets the American Iron and Steel Institute (A. I. S. I.) specifications for type 321 stainless steel in which the following chemistry is required:

| | |
|---|---|
| C | 0.08 max. |
| Mn | 2.0 max. |
| Si | 1.0 max. |
| Cr | 17.0/19.0 |
| Ni | 8.0/11.0 |
| Ti | 5×C min. |

This sample exhibited the following mechanical properties:

Ultimate tensile strength—85,500 pounds per sq. in.
Elongation 47.5%
Reduction in area 62.8%

That the 0.36% titanium deposited effectively stabilized the deposit against loss of its corrosion resistance is evidenced by the following results with the standard boiling 65% nitric acid corrosion test. The corrosion rate in five 48 hour periods in inches penetration per month was (1) .0009; (2) .0009; (3) .0011; (4) .0013; (5) .0015 for an average corrosion rate of .0011 inch penetration per month. This is well within the standard of .002 inch penetration per month for type 321 stainless steel. The above example demonstrates conclusively that according to the present invention a preselected quantity of titanium can be deposited in the weld metal and that weld metal can be deposited that satisfies the chemistry for type 321 stainless steels. The same type of coating can obviously be used with other types of core wires to deposit titanium bearing weld metal. Titanium bearing and non-titanium bearing core wires can also obviously be used. The titanium in the core wire can be considered to act in the chemical reaction outlined above approximately the same as does the titanium in the coating. Successful tests have been made with a type 308 stainless steel core wire and substantially the same coating as that described in detail above.

It will be evident that as a result of this invention it has been made possible to produce a titanium bearing alloy weld deposit by means of a coated arc welding electrode. While only one embodiment of the invention has been described in detail it is to be understood that the invention is not limited to the particular form described, but may be used in other ways without departure from its spirit as defined by the following claims.

I claim:

1. A method of producing a titanium stabilized chrome-nickel stainless steel arc weld deposit which comprises forming an arc between a chrome-nickel stainless steel core wire and a workpiece and adding titanium and aluminum to the weld in the form of an ingredient in a coating on said core wire which coating contains silicates in an amount not exceeding five times the combined weight of titanium and aluminum, and not more than 1% by weight of reducible carbon compounds whereby said titanium and aluminum reduce said silicates and other reducible compounds to produce weld metal having a silicon content of not more than 1%, and a residual titanium content of not less than five times the carbon content.

2. A welding electrode for the deposition of titanium stabilized stainless steel weld metal which comprises a chrome nickel stainless steel core wire and a coating, said coating containing alkaline earth fluoride, aluminum oxide, titanium dioxide, clay, a binder of alkali silicates, and titanium and aluminum in an amount such that the combined weight thereof is at least one fifth the weight of said binder to reduce all available reducible compounds and permit the recovery of residual titanium in the weld metal.

3. A welding electrode adapted for forming a titanium stabilized stainless steel weld deposit comprising a core wire of nickel-chromium-iron alloy with minor proportions of other alloying elements and a coating on the core wire, said coating containing by weight 15–35 percent calcium fluoride, 1–8 percent aluminum oxide, 30–60 percent titanium dioxide, 1–5 percent clay, 1–7 percent manganese metal, 1–10 percent magnesium and calcium oxide, 1–10 percent ferro chromium, 1–20 percent titanium aluminum alloy, and silicate binders in an amount not exceeding five times the weight of titanium aluminum alloy.

4. A welding electrode adapted for forming a titanium stabilized stainless steel weld deposit comprising a core wire of nickel-chromium-iron alloy with minor proportions of other alloying elements and a coating on the core wire, said coating containing by weight 3 parts of calcium fluoride, 0.75 part of aluminum oxide, 4.80 parts of titanium dioxide, 0.20 part of clay, 0.34 part of manganese metal, 0.60 part of magnesium oxide and calcium oxide, 0.39 part of ferro chromium, 0.90 part of titanium-aluminum alloy, and 3.28 parts of a sodium and potassium silicate binder.

References Cited in the file of this patent

UNITED STATES PATENTS

| Number | Name | Date |
|---|---|---|
| 1,501,266 | Brace | July 15, 1924 |
| 1,937,574 | Johnston | Dec. 5, 1933 |
| 2,067,630 | Franks | Jan. 12, 1937 |
| 2,140,238 | Leither | Dec. 13, 1938 |
| 2,150,925 | Johnston | Mar. 21, 1939 |
| 2,303,746 | Kihlgren et al. | Dec. 1, 1942 |
| 2,422,489 | Kihlgren et al. | June 17, 1947 |
| 2,464,836 | Thomas et al. | Mar. 22, 1949 |

FOREIGN PATENTS

| 488,871 | Great Britain | July 15, 1938 |